United States Patent
Sprague et al.

Patent Number: 5,264,880
Date of Patent: Nov. 23, 1993

[54] METHOD AND APPARATUS FOR PROJECTING A COLOR IMAGE

[75] Inventors: Robert A. Sprague, Saratoga; Richard H. Bruce, Los Altos, both of Calif.

[73] Assignee: Xerox Corporation, Stamford, Conn.

[21] Appl. No.: 814,153

[22] Filed: Dec. 30, 1991

[51] Int. Cl.⁵ .............................................. G03B 21/00
[52] U.S. Cl. ........................................ 353/31; 353/34
[58] Field of Search ............... 353/31, 34, 37, 30, 353/38, 122; 359/571, 567, 569

[56] References Cited

U.S. PATENT DOCUMENTS

| | | | |
|---|---|---|---|
| 3,510,216 | 5/1970 | Wagman | 353/32 |
| 3,822,930 | 7/1974 | Douklias | 359/567 |
| 3,923,389 | 12/1975 | Rogers et al. | 353/38 |
| 4,269,915 | 5/1981 | Moraw | 353/31 |
| 4,687,301 | 8/1987 | Ledebuhr | 350/401 |
| 4,971,436 | 11/1990 | Aoki et al. | 353/31 |
| 5,032,924 | 7/1991 | Brown et al. | 358/231 |

Primary Examiner—William A. Cuchlinski, Jr.
Assistant Examiner—William C. Dowling
Attorney, Agent, or Firm—Kenyon & Kenyon

[57] ABSTRACT

A method for achieving a color projection of an image directs light from a source to a dispersive element and disperses the light received by the element into a spectrum of light having different colors at different angles. Each color band of the resulting spectrum is focused, and the dispersed color bands are modulated in color bands corresponding to those received during the focusing onto a modulating element. Finally, the modulated light beams are recombined for projecting onto a projection surface.

21 Claims, 3 Drawing Sheets

METHOD AND APPARATUS FOR PROJECTING A COLOR IMAGE

BACKGROUND AND DISCUSSION OF THE INVENTION

Liquid crystal light valve projectors have been used in the past for large screen projectors utilizing liquid crystal light valves or LCLVs to modulate the light being projected. For this purpose the LCLVs are selectively modulated by an appropriate apparatus such as cathode ray tubes (CRT). Such systems have used a first color separator responsive to unmodulated polarized light for reflecting light of a first primary color and for transmitting the remaining portion of the incident unmodulated polarized light and for internally reflecting incident light.

Various color separating apparatus are utilized to separate the primary colors for respective individual modulation. Dichloric mirrors have been utilized, but they tend to exhibit astigmatism and polarization sensitivity. Prisms have also been used for avoiding problems associated with dichloric mirrors. However, in view of the heat generated, such prism assemblies may suffer from stress by refringence if used in a projector. Accordingly, known liquid crystal light projectors could not utilize the advantages of color separating prisms having glass prisms or wedges and instead utilize other color separation structures which do not provide the same performance.

With regard to known liquid crystal light valve projections the respective color channels include unequal path lengths through the optical structure of the color separation apparatus. As a result, image quality is degraded.

Other known liquid crystal light valve projectors utilize both axes of polarization and are characterized by reduced contrast. Other systems utilize unmodulated polarized light with internal reflecting systems for separating colors into various primary colors. An example of such a system is shown in U.S. Pat. No. 4,687,301 issued to Ledebuhr on Aug. 18, 1987.

The problem with this type of system is that the resolution is not necessarily acceptable because of the effect of the filters. By using a modulator with high efficiency, according to Applicant's invention, a much better color projection system is obtained than has heretofore existed.

The apparatus or system which overcomes the problems discussed above include a white light source illuminating a dispersive element which angularly separates the light spectrum to provide different colors at different angles. This angularly dispersed light illuminates a lenticular lens array placed in front of a segmented spatial light modulator. Since the angle of the primary colors of red, blue and green are different they focus at different lateral positions behind the lenticular array. The array of light modulators is located so that each focused color spot illuminates a different modulating element. This results in three modulating elements for each of the lenticular lenses with data address to provide red, blue and green pixels located side by side. The elements are recombined on a projection screen by a single projection lens so that they are either resolved or they are blurred out using a defocus.

DETAILED DISCUSSION OF THE PREFERRED EMBODIMENT

Figure 1:
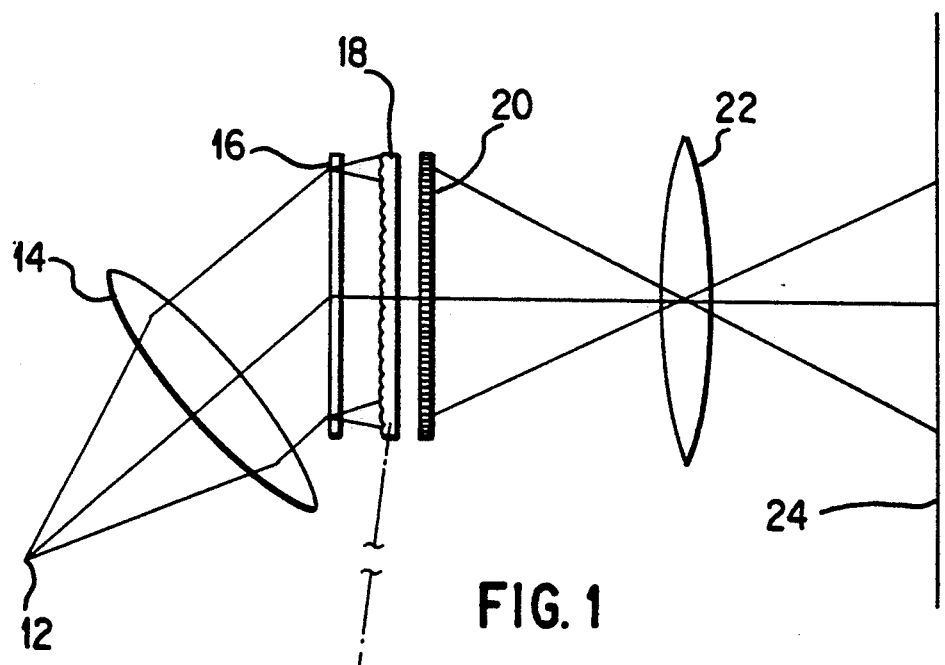
FIG. 1 is a schematic of the system of the invention.

As shown in FIG. 1, a color projection system 10 utilizes a white light source 12 to provide white light which includes a broad spectrum of light, including the red, blue and green spectrum. A collimator lens 14 is arranged between the white source 12 and a blaze grating 16 for directing the light from light source 12 at an angle to blaze grating 16 as shown. Arranged in spaced relationship and parallel to blaze grating 16 is a lenticular array of lenses 18. A spatial light modulator array 20 is also arranged parallel to the lenticular array 18 and spaced therefrom in a position remote from blaze grating 16. Between the projection screen 24 and the spatial light modulator array 20 is a projection lens 22 for projecting the image developed at the spatial light modulator array onto the projection screen 24.

Figure 2:
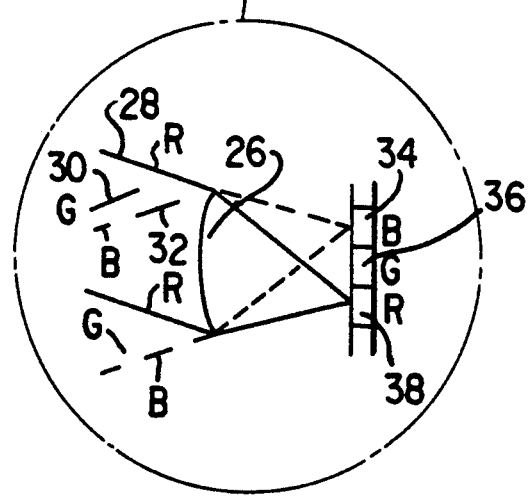
FIG. 2 is a blow up of a portion of the system shown in FIG. 1.

With this system the original light source provides an image through lens 14 which is collimated and directed at an angle to blaze grating 16. At this position, as better shown in FIG. 2, blaze grating 16 is activated to provide for example specific portions of the light spectrum, such as red, green and blue shown as 28, 30 and 32, respectively. As these portions of the spectrum arrive at an individual lens 26 of lenticular array 18, they will be focused and directed to a modular array having corresponding blue, green and red pixels at 34, 36 and 38 as shown. The lenticular array 18, because of the angle of the light striking it, will direct the portion of the spectrum to its corresponding pixel on the array as shown. In other words, the red portion of the spectrum 28 will be directed to the red pixel 38, the blue portion of the spectrum will be directed to the blue pixel 34 and finally the green portion of the spectrum 30 will be directed to the green pixel 36. This modulator will then provide an image which is focused on a projection screen 24 by projection lens 22. With this system there are three modulating elements for each of the lenticular lens with data address to provide red, blue and green pixels located side by side. The elements are recombined on a projection screen by a single projection lens so that they either resolve giving laterally located RGB pixels or they are blurred out using defocus, a limiting aperture, or some other form of apozicing plate in the lens aperture so that the colors are not resolvable.

Figure 3:
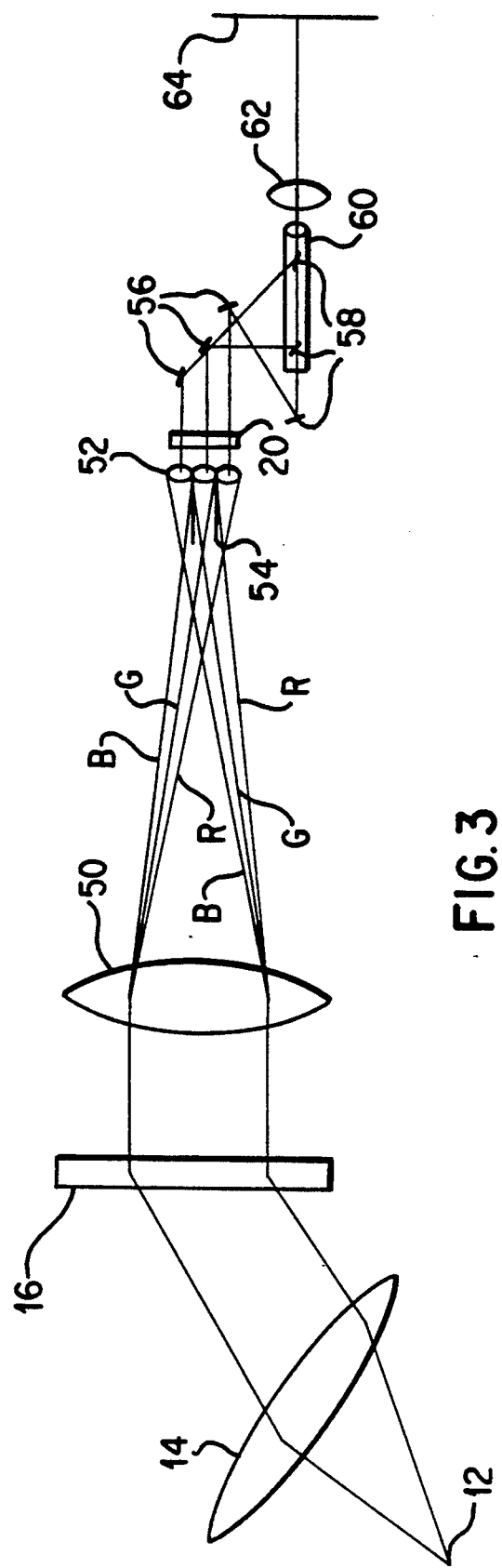
FIG. 3 is an alternative embodiment of the invention.

FIG. 3 demonstrates an alternative way to achieve the same result in which a focusing element is used to provide aerial images of the three color spots. In this figure it should be noted that like reference numbers correspond to like elements as described above. Downstream of light path from lens 14 is located a blaze grating 16 as in FIG. 1. Rather than a lenticular array, an array of collecting lenses are arranged adjacent the spatial light modulator 20 as shown.

Between the collecting lens array 52 and blaze grating 16 is a focusing element 50, located adjacent blaze grating 16. Focusing element 50 directs and focuses image from blaze grating 16 on the collecting lens array 52 as shown. Each lens in the lens array 52 is separated by a horizontal baffle 54. The collecting lenses 52 collect the light from each of the three color spots (one for each colored spot) and uses each different color to illuminate a different region on the spatial light modulator 20. In this case the three images are side by side rather than each pixel having three color elements as noted above.

The three images are brought back together on a projection screen using a combination of mirrors and dichloric beam splitters, one version of which is shown in the figure. Specifically, mirrors 15 are arranged to direct the image downwardly toward mirror 58 which again directs the image laterally through a double dichloric beam splitter 60. The projection lens focuses the image emanating from beam splitter 50 to projection screen 64 similar to that noted above with respect to projection lens 22.

Figure 4:
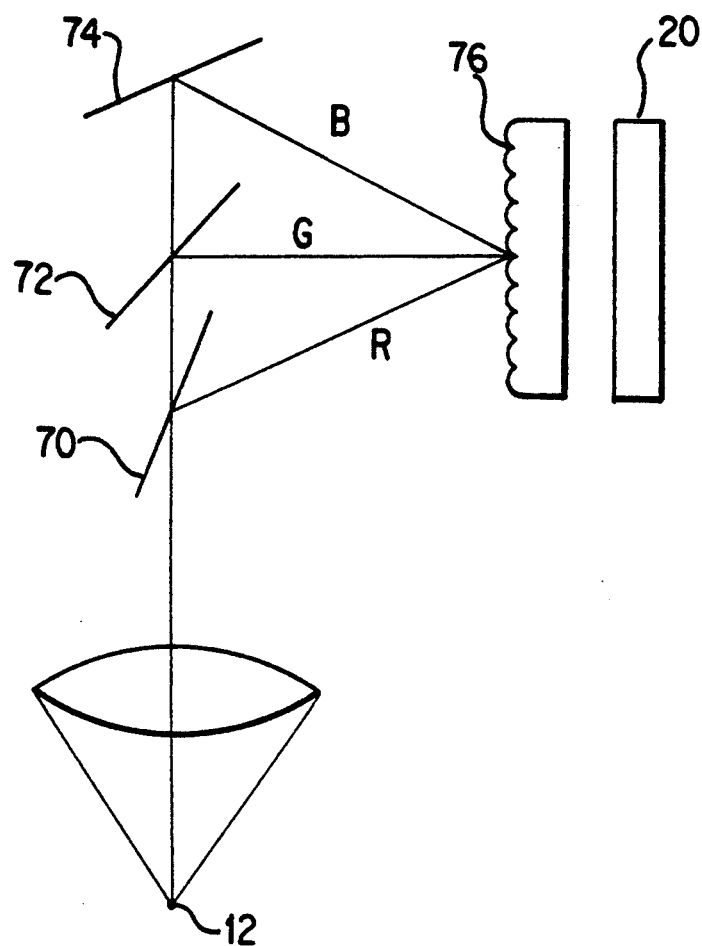
FIG. 4 is another schematic of a third embodiment of the invention.

Another approach shown in FIG. 4 is the use of a white light source 12 which directs the light to dichloric mirrors 70, 72, 74 which in turn focus the images to a lenticular array 76 and spatial light modulator as discussed above. The advantage of course of the dichloric mirrors is the elimination of the need for the lens and the blaze grating as discussed before. The other elements downstream of this portion of the apparatus would be the same as discussed above and need not be reiterated here.

What is claimed is:

1. A method for projecting a color image comprising:
   (a) directing light from a light source to a dispersive element;
   (b) dispersing light received by said dispersive element into a spectrum of light having different color bands at different angles;
   (c) focusing each color band of said spectrum onto a modulating element;
   (d) modulating said color bands into light beams corresponding to said color bands; and
   (e) recombining said light beams for projecting onto a projection surface.

2. The method according to claim 1, wherein said step of directing light from a light source includes directing light from a white light source.

3. The method according to claim 1, wherein the step of directing light from a light source to a dispersive element includes directing light from a white light source to a lens for receiving white light and directing collimated light to said dispersive element.

4. The method according to claim 3, wherein said dispersive element includes a blazed grating.

5. The method according to claim 4, wherein the step of dispersing light further comprises dividing said light into three bands of red, blue and green, respectively, with the dispersing element.

6. The method according to claim 1, wherein said focusing step further comprises focusing with a lenticular array of a series of lenses, where each lens is substantially identical to its adjacent lens.

7. The method according to claim 1, wherein said modulating element comprises a spatial light modulator from which light waves emanate, corresponding to light waves received from said focusing step.

8. An apparatus for achieving a color projection of an image comprising:
   (a) a source of light;
   (b) a dispersing element for dispersing light into a spectrum of light having different colors at different angles;
   (c) a light director for directing light from said source to said dispersing element;
   (d) a lenticular array arranged with respect to said dispersing element for receiving a light spectrum there in the form of color bands;
   (e) a modulating element arranged with respect to sad lenticular array, said lenticular array configured for focusing each dispersed color band onto said modulating element; and
   (f) a recombiner for recombining light beams for projecting onto a projection surface.

9. The apparatus according to claim 8, wherein said light source comprises a white light source.

10. The apparatus according to claim 8, wherein said light director includes a lens for receiving light and directing said light in a collimated form to said dispersive element.

11. The apparatus according to claim 8, wherein said dispersive element includes a blazed grating.

12. The apparatus according to claim 8, wherein said dispersive element includes a light divider for dividing said light into three bands of red, blue and green, respectively.

13. The apparatus according to claim 8, wherein said lenticular array includes a series of lenses wherein each lens is identical to its adjacent lens.

14. The apparatus according to claim 8, wherein said modulating element includes a spatial light modulator from which a blue, green or red light wave emanates corresponding to the light waves received form said lenticular array.

15. A method for achieving a color projection of an image comprising:
   (a) directing light from a light source to a dispersive element;
   (b) dispersing light received by said dispersive element into a spectrum of light having different color bands at different angles;
   (c) focusing each dispersed color band onto a collecting lens array;
   (d) focusing each dispersed color band directed to the collecting lens array onto a modulating element;
   (e) modulating said dispersed color bands in color bands corresponding to those received by the modulating element during said focusing step d; and
   (f) recombining light beams for projecting onto a projection surface.

16. The method according to claim 15, wherein said step of directing light further comprises directing light from a white light source.

17. The method according to claim 1, wherein said step of directing light from a light source to a dispersive element includes directing light from a light source to a lens for receiving white light and directing light in a parallel path to said dispersive element.

18. The method according to claim 15, wherein said dispersive element includes a blazed grating.

19. The method according to claim 15, wherein said dispersive element divides said light into three bands of red, blue and green, respectively.

20. The method according to claim 15, wherein said collecting lens array includes a series of lenses where each lens is identical to its adjacent lens.

21. The method according to claim 15, wherein said modulating array is a spatial light modulator from which blue, green or red light waves emanate corresponding to the light waves received from said lenticular array.

* * * * *